Figure 7:
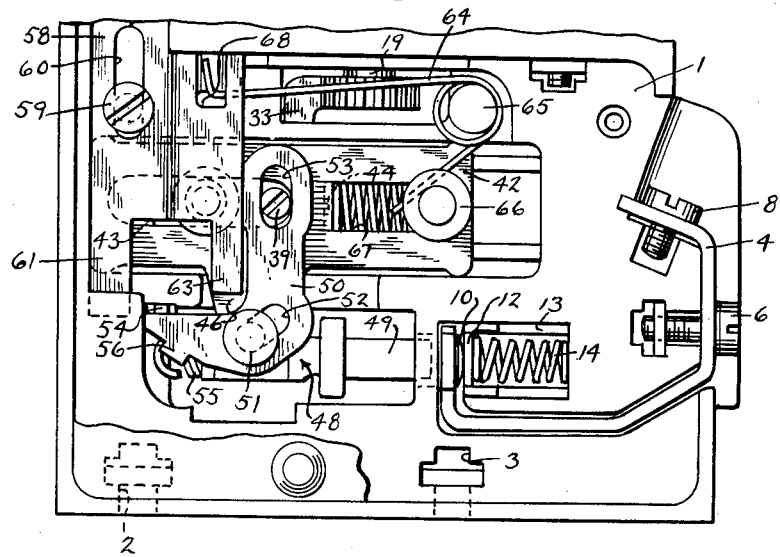

July 2, 1963 G. C. BOYSEN 3,096,416
PROTECTIVE RELAY
Filed May 27, 1960 7 Sheets-Sheet 1
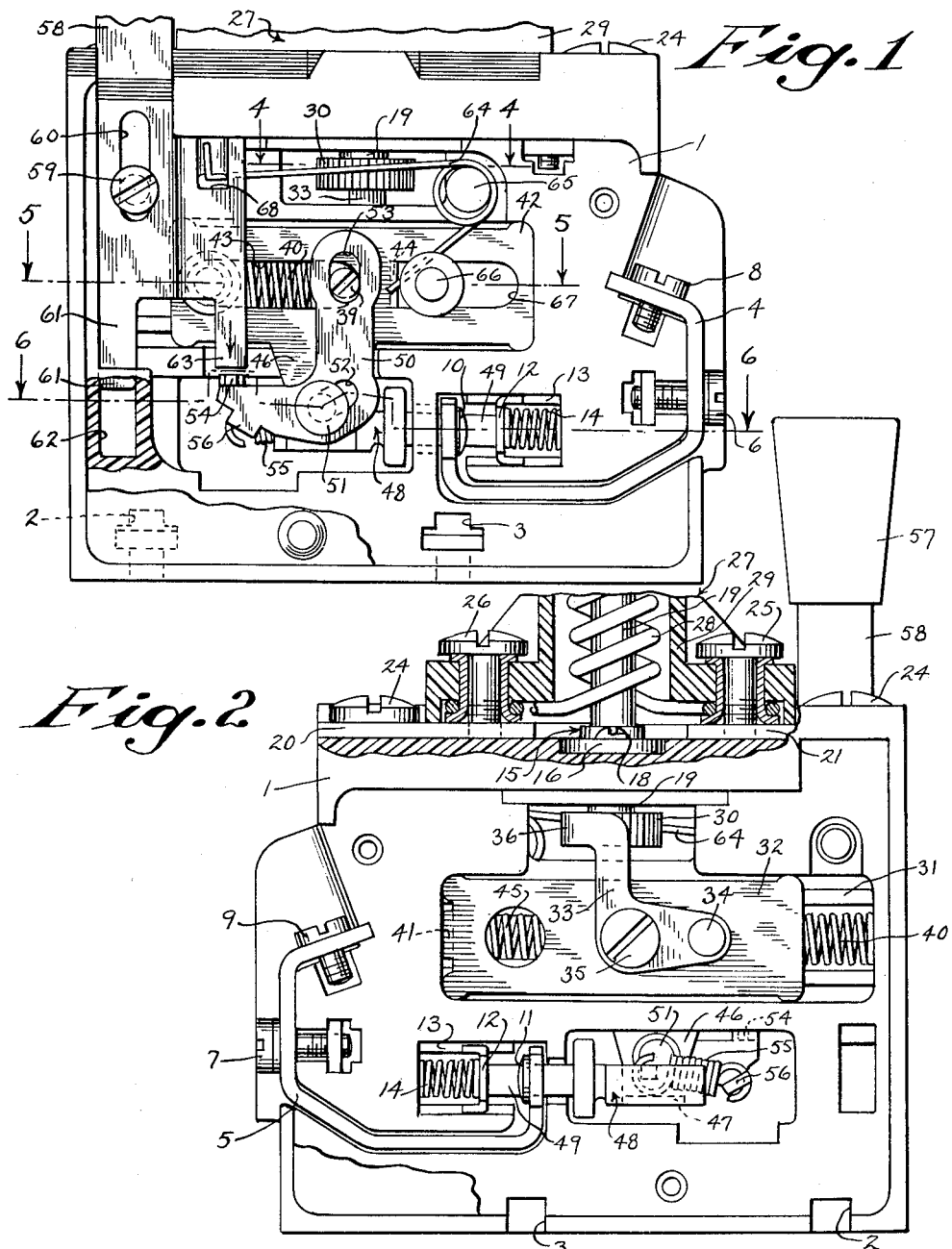
INVENTOR
GERD C. BOYSEN
BY Arthur H. Seidel
ATTORNEY July 2, 1963  G. C. BOYSEN  3,096,416
PROTECTIVE RELAY
Filed May 27, 1960  7 Sheets-Sheet 2
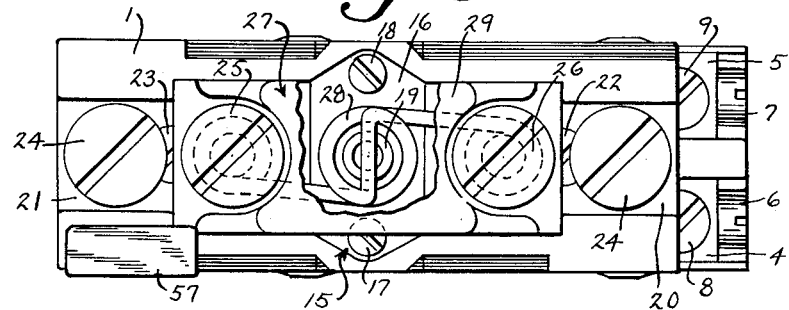
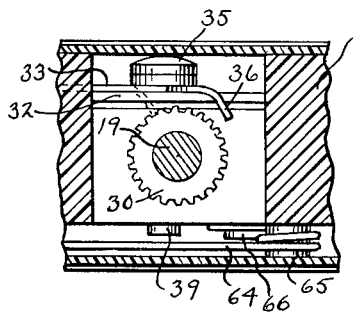
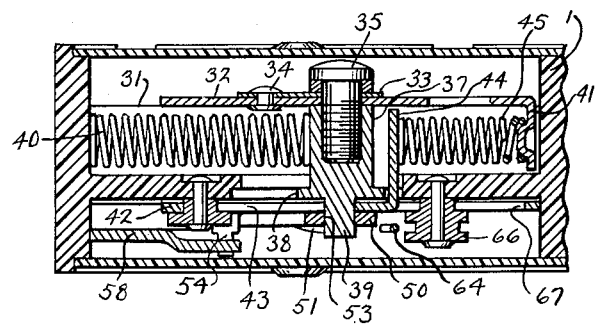
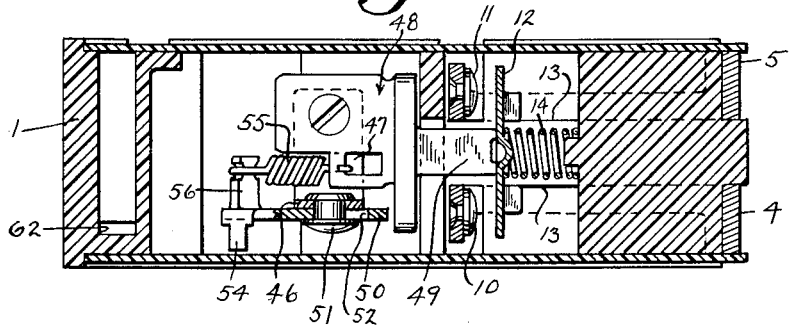
INVENTOR
GERD C. BOYSEN
BY *Arthur H. Seidel*
ATTORNEY July 2, 1963

G. C. BOYSEN 3,096,416

PROTECTIVE RELAY

Filed May 27, 1960

7 Sheets-Sheet 4

INVENTOR
GERD C. BOYSEN

BY

ATTORNEY

INVENTOR
GERD C. BOYSEN

BY *Arthur H. Seidel*

ATTORNEY

July 2, 1963  G. C. BOYSEN  3,096,416
PROTECTIVE RELAY
Filed May 27, 1960  7 Sheets-Sheet 6
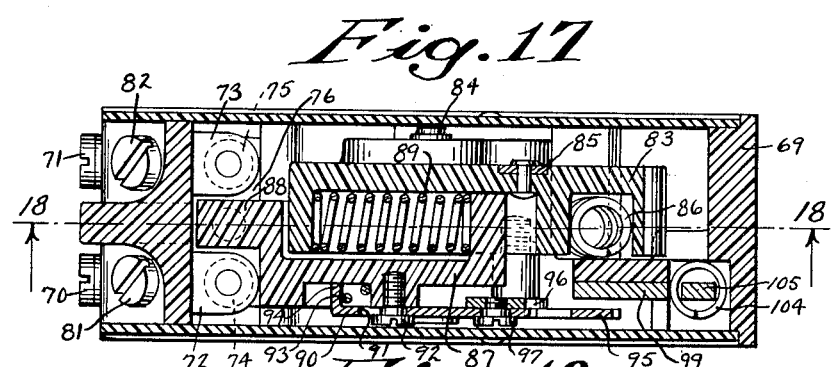
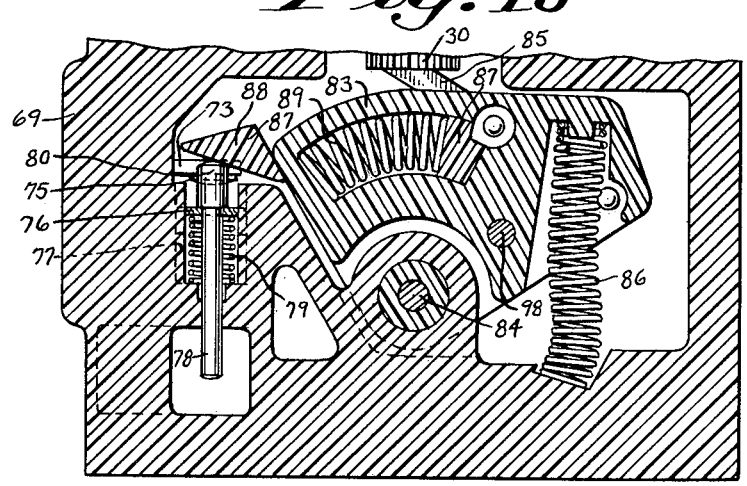
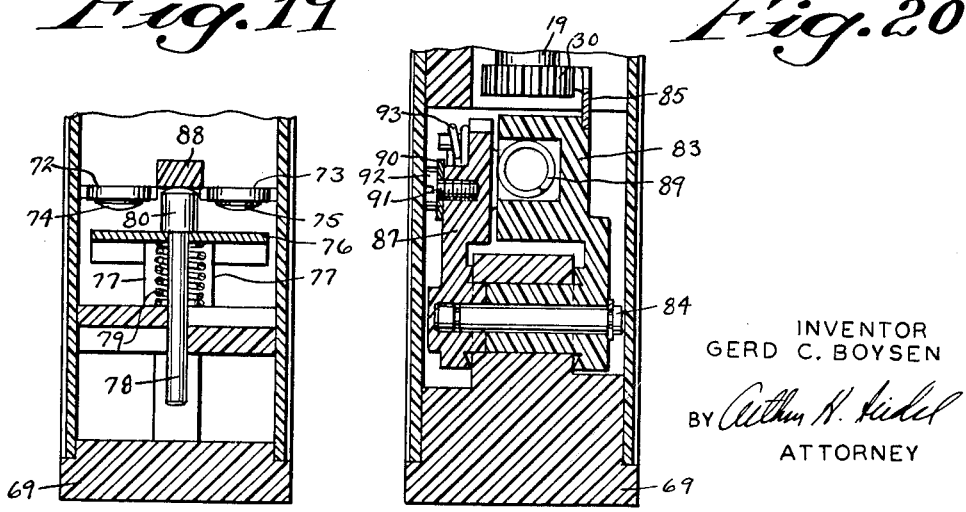
INVENTOR
GERD C. BOYSEN
BY [signature]
ATTORNEY July 2, 1963  G. C. BOYSEN  3,096,416
PROTECTIVE RELAY
Filed May 27, 1960  7 Sheets-Sheet 7

INVENTOR
GERD C. BOYSEN
BY *Arthur H. Seidel*
ATTORNEY

United States Patent Office 3,096,416
Patented July 2, 1963

3,096,416
PROTECTIVE RELAY
Gerd C. Boysen, Milwaukee, Wis., assignor to Allen-Bradley Company, Milwaukee, Wis., a corporation of Wisconsin
Filed May 27, 1960, Ser. No. 32,372
9 Claims. (Cl. 200—124)

This invention relates to protective relays; and it more particularly resides in a relay having an actuator movable to an actuated position by a trip member and a cocking mechanism, mounted on the actuator and operable by a reset lever, that retains the actuator in actuated position as the trip member is cocked and then permits the actuator to return from acuated position, said relay being characterized by a yieldable linkage between the reset lever and actuator under certain circumstances whereby the actuator will be free to move to actuated position regardless of the position of the reset lever.

Protective relays are commonly incorporated into motor control circuits whereby an overload or excessive current will cause a relay operation which will in turn cause the motor circuit to be opened. Although relays embodying this invention are particularly adapted for such use, however, they will also be found useful in a great number of other relay applications.

It has long been considered desirable for protective relays to be both trip-free and tamper-free. A trip-free relay may be defined as one wherein the reset lever, regardless of its position, cannot act to prevent operation of the relay in the presence of tripping conditions; and a tamper-free relay may be defined as one wherein the reset lever, regardless of its position, cannot cause operation of the relay except after a tripping action. It can readily be seen that both of the foregoing properties are necessary to prevent accidental or intentional interference, by manipulation of a relay, with the operation of a relay-controlled device.

Several attempts have been made to incorporate trip-free and tamper-free properties in protective relays, but the resulting relays have generally been ineffective. One such device, however, described in the copending application of Robert E. Walters, Serial No. 32,250, has proven very satisfactory in providing the required properties. This device makes use of a trip member movable from cocked to tripped position in response to overload or other tripping conditions, which member serves to move an actuator toward an actuated position, said actuator in turn serving to open or close contacts or the like. A cocking mechanism is mounted upon the actuator and serves, when operated by the depression of a reset lever, to hold the actuator in actuated position while returning the trip member to cocked position, said actuator being subsequently freed to return from its actuated position. The cocking mechanism is provided with a working arm which moves, with the actuator, along a path of movement toward actuated position, and a projecting finger of the reset lever is adapted to workably engage the working arm of the cocking mechanism only at a point on its path of movement where the actuator has completed its movement to actuated position. The finger is, however, capable of a blocking engagement with the working arm at a point prior to the completion of the movement of the actuator, but the relay is designed so that such blocking engagement can occur only after the actuator has effectively completed its movement. Thus, even when the reset lever is held in a depressed position prior to tripping, wherein the finger may block the movement of the cocking mechanism and, therefore, the actuator, such blocking cannot prevent the opening of the contacts or the like. This is accomplished by providing a greater length of travel for the actuator and cocking mechanism than would ordinarily be warranted in order that the abbreviated movement of the actuator when it is blocked by the reset lever will still be sufficient to operate the relay contacts.

Although the provision of such excessive travel is effective in providing for a trip-free action, however, it gives rise to certain disadvantages with respect to the construction of the relay as a whole. Accordingly, it is the primary object of this invention to provide a simple but effective "lost motion" means, constituting a yieldable linkage, to allow relative movement between the actuator and reset lever of a relay of the aforesaid type whereby it is unnecessary to provide for excessive travel of the actuator.

Other objects, advantages and applications of the invention will, however, become apparent from the description to follow. In the description, reference is made to the accompanying drawings, forming a part hereof, in which there are shown by way of illustration and not of limitation specific relays embodying the invention.

In the drawings:

FIG. 1 is a front view in elevation with parts broken away and in section of a thermally responsive relay embodying the invention, the elements being shown in the positions assumed subsequent to a normal tripping action, FIG. 2 is a rear view in elevation with parts broken away and in section of the relay of FIG. 1, the elements being in the positions assumed subsequent to a normal tripping action, FIG. 3 is a top view with parts broken away of the relay shown in FIGS. 1 and 2, FIG. 4 is a fragmentary view in section of the relay taken in the plane 4—4 indicated in FIG. 1, FIG. 5 is a fragmentary view in section of the relay taken along the plane 5—5 indicated in FIG. 1, FIG. 6 is a view in section of the relay taken along the plane 6—6 indicated in FIG. 1, FIG. 7 is a front view in elevation similar to FIG. 1, with the elements being shown in the positions assumed prior to a tripping action.

Figure 8:
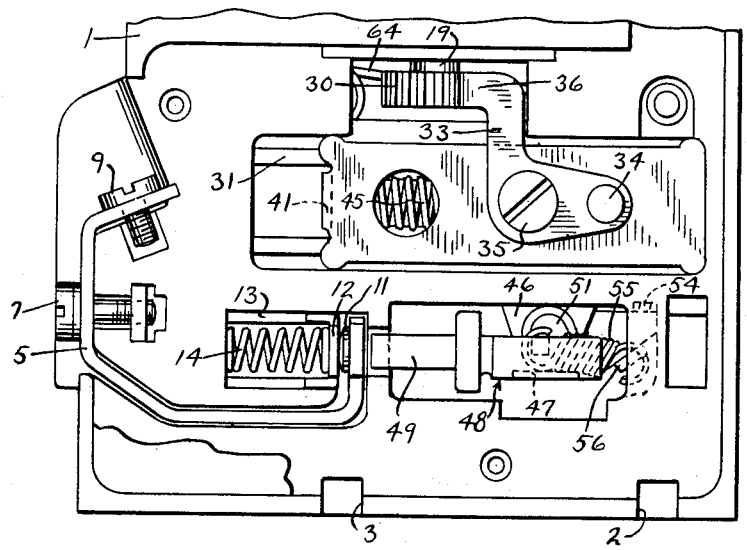
Figure 9:
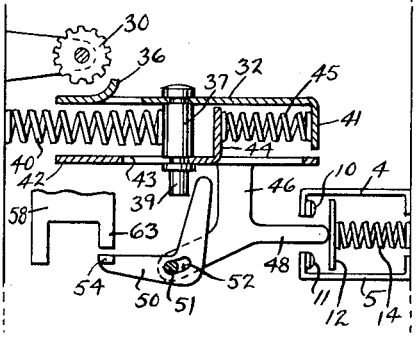
Figure 12:
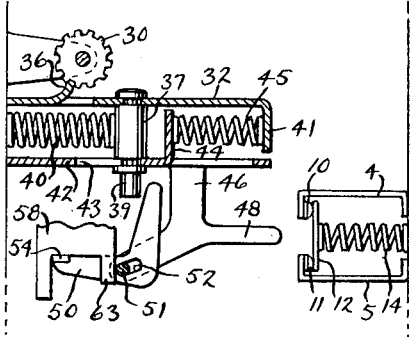
Figure 10:
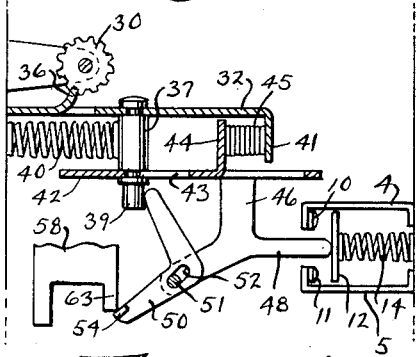
Figure 13:
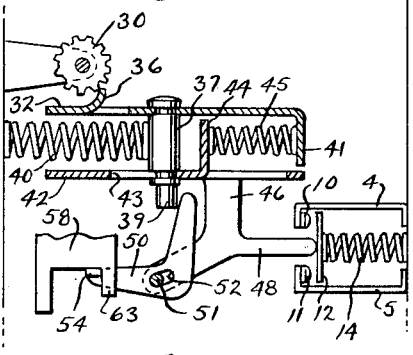
Figure 11:
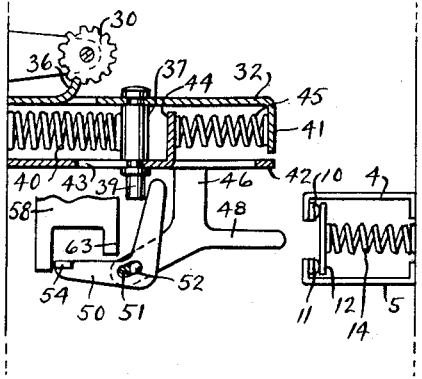
Figure 14:
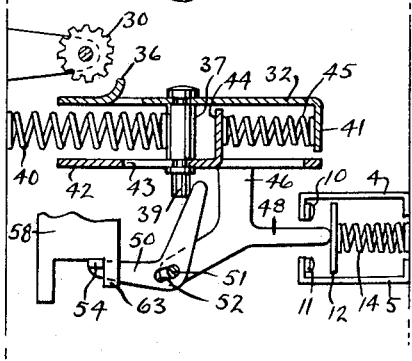
Figure 15:
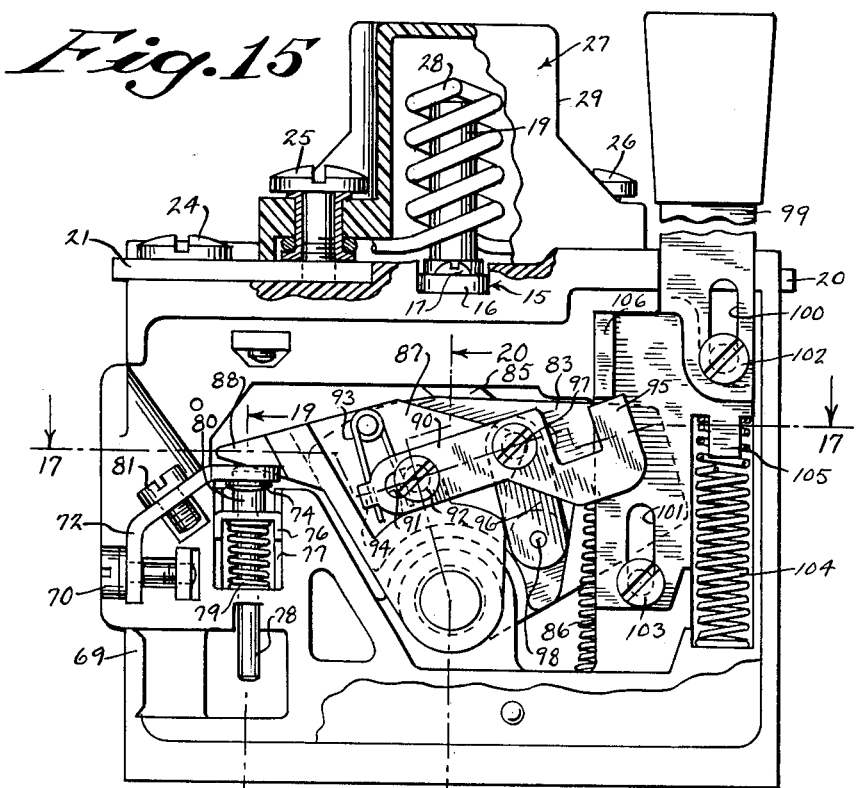
Figure 16:
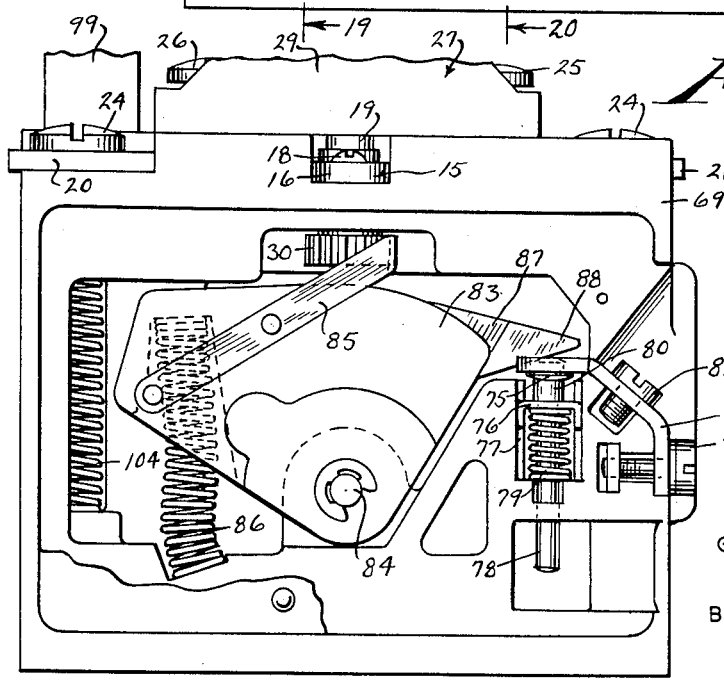
Figure 21:
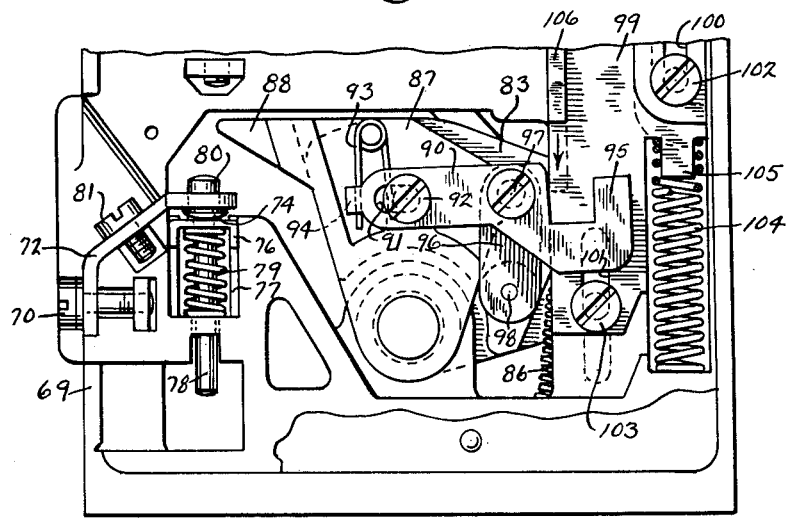
Figure 22:
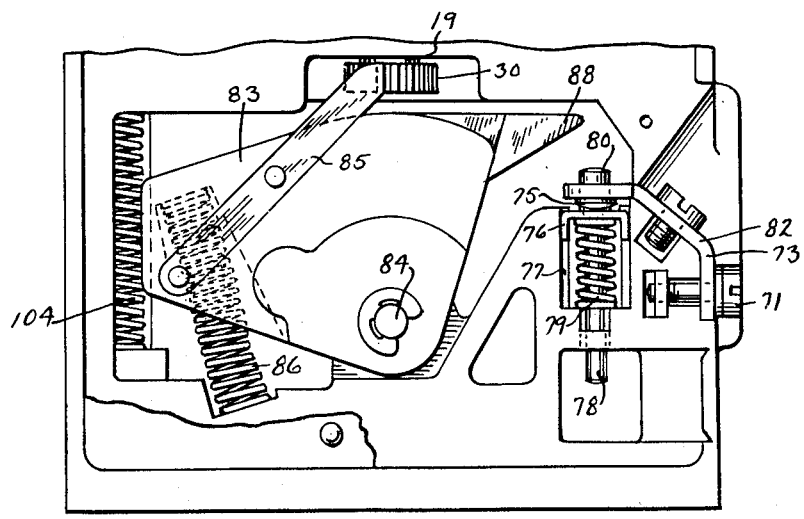

FIG. 8 is a rear view in elevation similar to FIG. 2 with the elements being shown in the positions assumed prior to a tripping action, FIG. 9 is a schematic representation of the principal operating elements of the relay of FIGS. 1–8, such elements being shown in positions assumed subsequent to a normal tripping action, FIG. 10 is a schematic representation of the relay with the elements in the positions assumed prior to the final increment of a resetting action, FIG. 11 is a schematic representation of the relay with the elements shown in the position assumed upon the completion of a resetting action, FIG. 12 is a schematic representation of the relay with the elements shown in their reset positions prior to a tripping action, and with the reset lever in depressed position, FIG. 13 is a schematic representation of the relay with the elements shown in positions assumed during a phase of a tripping action occurring while the reset lever is depressed, FIG. 14 is a schematic representation of the relay with the elements shown in the positions assumed upon completion of the tripping action occurring while the reset lever is depressed, FIG. 15 is a front view in elevation with parts broken away and in section of a second embodiment of the invention in which a rotary action is utilized for operation of the relay, the elements being shown in the positions assumed subsequent to a normal tripping action, FIG. 16 is a rear view in elevation with parts broken away of the second embodiment with elements thereof in positions assumed subsequent to a normal tripping action, FIG. 17 is a view in section of the second embodiment taken in the plane 17—17 as designated in FIG. 15, FIG. 18 is a fragmentary view in section of the second embodiment taken in the plane 18—18 as designated in FIG. 17, FIG. 19 is a fragmentary view in section of the second embodiment taken in the plane 19—19 as designated in FIG. 15, FIG. 20 is a fragmentary view in section of the second embodiment taken in the plane 20—20 as designated in FIG. 15, FIG. 21 is a fragmentary front view in elevation with parts broken away of the second embodiment with the elements thereof being shown in the positions assumed prior to a tripping action, and FIG. 22 is a fragmentary rear view in elevation with parts broken away of the second embodiment with the elements thereof in the positions assumed prior to a tripping action.

Referring now to FIGS. 1 through 8 and the embodiment of the invention shown therein, the numeral 1 designates a molded case of insulating material on which the operating parts of the relay are mounted. Mounting holes 2 and 3 are provided in the case 1 and stationary contact terminals 4 and 5 are secured in place by means of mounting screws 6 and 7. The terminals 4 and 5 are provided with upwardly extending portions which threadedly receive terminal screws 8 and 9 to which control circuit leads may be attached. Terminals 4 and 5 also extend inwardly within the case 1 to present a pair of spaced stationary contacts 10 and 11 which are bridged by a movable contact 12 slidably mounted and guided by a track 13 formed as a part of the case 1. A contact bias spring 14 urges the bridging contact 12 toward a closed position with contacts 10 and 11.

Referring more specifically to FIGS. 2 and 3, a solder type thermal responsive unit 15 is mounted upon the top of the case 1. The thermal unit 15 includes a molded base 16 secured in place by screws 17 and 18, and a hollow heat conducting stud 19 extending from above the base to its underside. The stud 19 is restrained from rotation by a crimped connection with the base 16. On opposite sides of the thermal unit 15 are conducting busses 20 and 21 secured atop the case 1 by screws 22 and 23. The outer ends of busses 20, 21 are provided with a pair of terminal screws 24 which serve for connecting the relay into a load circuit, such as one phase of the line leading to a polyphase motor. The inner ends of busses 20, 21 are provided with threaded openings to receive terminal screws 25 and 26. Mounted by terminal screws 25 and 26, and thereby electrically bridging the gap between busses 20, 21, is a heater 27 consisting of a resistance coil 28 and a case 29 that protects the coil 28 from air currents. The coil 28 encircles the stud 19, whereby the heat transfer from the resistance coil 28 to the stud 19 is a measure of load current passing through the busses 20, 21.

The stud 19 extends downwardly within the case 1 and forms a bearing for a rotatable ratchet 30 that is normally restrained from rotation by a film of a heat fusible alloy, such as an eutectic solder, occupying the clearance between the stud 19 and the ratchet 30. Thus, when the heat generated by current flowing through coil 28 is sufficient to heat stud 19 and fuse the alloy, ratchet 30 will be free to rotate, thereby providing an indication of an overload, or excessive current in a load circuit. As in usual practice the composition and configuration of the coil 28 may be selected to provide for the release of ratchet wheel 30 at any desired current, whereby a range of operation may be had.

Referring now more particularly to FIGS. 2, 4 and 5, case 1 is provided with a shallow, but wide track 31 in which there is slidably mounted a rectangular trip member 32 shaped from thin sheet material. A resilient metal pawl 33 is mounted on the trip member 32 by a rivet 34 and an assembly screw 35, and includes an inwardly turned ear 36, shown more particularly in FIG. 4, that is engageable with the ratchet 30. Also mounted on trip member 32, by means of the screw 35, is a sidewardly projecting pin 37 provided with a rim 38 and a projection 39 at the end remote from the trip member 32. A spring 40 is interposed between the pin 37 and a wall of the case 1 to urge trip member 32 in a direction to the right as seen in FIG. 5, movement to the right being limited by the length of the trip member track 31 and an inwardly turned trip member ear 41. When the trip member 32 is moved by the spring 40, which is to the right on FIG. 5 and to the left in FIG. 2, it is said to be in tripped position. As shown in FIGS. 2 and 4, trip member 32 may assume the tripped position only when pawl ear 36 is disengaged from the ratchet 30. When pawl ear 36 is in engagement with ratchet 30, trip member 32 is held against the action of the spring 40 in a position as shown in FIG. 8, which would be to the left in FIG. 5, and this position may be termed a cocked position. Hence, when the fusible alloy, normally restraining ratchet 30 from rotation, fuses in response to excessive heat from the coil 28, ratchet 30 will be free to rotate to release the pawl ear 36 and allow spring 40 to move trip member 32 to tripped position. The ratchet 30 thus functions as a releasable catch and the pawl ear 36 is a latch that is held captive by such catch until a condition for release occurs.

As seen more particularly in FIGS. 1, 5 and 6, track 31 also slidably mounts an actuator 42 that is provided with a longitudinal slot 43 through which the pin projection 39 extends. Actuator 42 is formed of thin sheet material and is provided with an inwardly turned ear 44 spaced from the rim 38 of the pin 37. A compression spring 45 is placed between the trip member ear 41 and the actuator ear 44 to urge the actuator 42 in a direction to the left as seen in FIGS. 1, 5 and 7, and the position to the left is herein termed a retracted position. The spring 45 can be arranged, however, to operate between the actuator 42 and the case 1. Such retracted position is assumed in FIG. 7, while the position to the right as shown in FIGS. 1 and 5 is said to be an actuated position.

Actuator 42 is also provided with a downwardly extending portion 46 which is bent at its lower end to form an inwardly turned platform 47 on which is mounted a rod 48 of complex configuration. The rod 48 has a free end 49 projecting toward the movable contact 12 and upon moving the rod 48 with the actuator 42 into actuated position the free end 49 will strike the contact 12 and carry it to open position, as seen in FIGS. 1, 2 and 6.

As is shown in FIGS. 1 and 7, a cocking lever 50 in the form of a bell crank is mounted on the actuator portion 46 by a pin 51 passing through a slot 52 near the center of the bell crank. Cocking lever 50 is also provided at its upper end with a second slot 53 which encircles the projection 39 of the trip member pin 37. In addition, cocking lever 50 is provided with a working arm 54 at the lower end, which projects outwardly to extend into the vertical path of a reset lever 58. Due to slot 52, cocking lever 50 is capable of some sliding motion along the pin 51, which motion is normally prevented by a spring 55 connected at one end on an inwardly turned ear 56 of the bell crank 50 and connected at its other end to the platform 47 and rod 48. The slot 52 and spring 55 serve to provide a yieldable connection between the reset lever 58 and actuator 42 in a manner to be hereinafter described.

The reset lever 58 is free to move vertically in complementary recesses of case 1 and is held captive by a pin 59 that extends through a slot 60 in the lever 58. Lever 58 is further guided by having a lower projection 61 fit snugly within a slide 62 formed in case 1. The upper end of the reset lever 58 extends above the case 1 to present a manually engageable cap 57, and the lower end of lever 58 has a downwardly projecting finger 63 parallel to and spaced inwardly from the projection 61, so as to present a bifurcated lower end. The finger 63 is positioned to engage the cocking lever arm 54 when the cocking lever 50 is in the position shown in FIG. 1, corresponding to the actuated position of the actuator 42. Otherwise, the finger 63 will slide by the arm 54 upon depression of reset lever 58. A grasshopper spring 64, centered on a pin 65 mounted on case 1, has one end anchored against a pin 66 that is mounted on case 1 and passes through a slot 67 of actuator 42. The other end of spring 64 engages in an opening 68 of reset lever 58 to urge the reset lever 58 in an upward direction.

The operation of the embodiment of the invention shown in FIGS. 1 through 8 may now be explained by reference to FIGS. 9 through 14 wherein the elements schematically represented are designated by reference numerals corresponding to the numerals used for like parts in the description of FIGS. 1 through 8.

Referring first to FIG. 11, the elements of the relay are shown in the positions normally assumed prior to a tripping action, or subsequent to the completion of a reset action. That is, pawl ear 36 is in engagement with ratchet 30, thereby holding trip member 32 against spring 40 and in a cocked position. Spring 45 has moved actuator 42 into its retracted position, thereby bringing the forward end of slot 43 into engagement with pin 37 and moving actuator rod 48 out of engagement with bridging contact 12. Hence, spring 14 has moved bridging contact 12 into closed position so that a circuit may be completed through the relay. Also, cocking lever 50, with its arm 54, has been carried by actuator 42 to a corresponding retracted position where arm 54 is out of the path of travel, and therefore not engageable by finger 63. Thus, the circuit to be protected by the relay is allowed to be normally activated and manipulation of the reset lever 58 may in no way affect the normally closed contact position.

Referring now to FIG. 9, the elements of the relay are shown in the positions assumed immediately after a normal tripping action. Thus, the heat caused by an excessive current has freed ratchet 30 so that the pawl ear 36 is no longer restrained. Trip member 32 has therefore been moved by spring 40 into its tripped position, and its pin 37 has engaged actuator 42 at the forward end of slot 43 to carry the actuator into its actuated position. The rod 48 has consequently engaged bridging contact 12 to open the same and interrupt the circuit in which the contacts are connected. The movement of the actuator 42 has also carried the cocking lever 50 to a position wherein the arm 54 is directly beneath the reset finger 63.

With the elements in the tripped position of FIG. 9, resetting can readily be accomplished by depressing reset lever 58 to cause the finger 63, through the working arm 54, to rotate the cocking lever 50 counterclockwise as viewed in FIGS. 9–14. In FIG. 10 the elements are shown in the positions assumed upon fully depressing reset finger 63, this being immediately prior to the completion of the reset action. Reset finger 63 has moved downwardly against the working arm 54 to pivot cocking lever 50 about pin 51 whereby the upper leg of cocking lever 50 has forced pin 37, and hence trip member 32, to the left, as seen in FIG. 10. This is the cocked position for trip member 32 and the pawl ear 36 has engaged with the ratchet 30, so that the member 32 will remain in cocked position if the ratchet 30 has become fixed by solidification of the solder. A resultant force of the pivot motion of the cocking lever 50 causes the lever 50 to work against the pin 51 so as to hold the actuator 42 in its actuated position during the initial resetting action. The spring 45 is compressed by the motion of trip member 32 relative to the actuator 42 and is thereby prepared to urge the actuator 42 toward retracted position upon release of the reset finger 63. The actuator rod 48 is therefore held in engagement with bridging contact 12 to maintain an open contact position. The circuit in which the relay contacts have been inserted is thus maintained in an interrupted condition throughout the resetting of the trip member 32, thereby preventing reestablishment of a control circuit which would cause damage to related equipment in the presence of a continuing overload condition.

When reset finger 63 is released from the position shown in FIG. 10, the parts will assume a position dependent upon the condition of ratchet 30. If an overload still persists and the fusible alloy is in a melt the ratchet 30 will rotate upon release of the reset lever and the parts will resume the positions shown in FIG. 9 in response to the spring 40. If, however, an overload is no longer present and the fusible alloy has cooled, ratchet 30 then being prevented from rotation, pawl ear 36 will be engaged and held so that the parts will assume positions shown in FIG. 11 wherein spring 45 has returned the actuator 42 to its retracted position, the cocking lever 50 has pivoted to its normal position, and rod 48 has retreated from the bridging contact 12 to have a normally closed condition.

It may be noted that throughout the normal tripping and resetting operation shown in FIGS. 9–11 the cocking lever 50 remains in its normal position longitudinally relative to the actuator 42. That is, the slot 52 does not allow relative motion during normal operation, thus providing for a positive mechanical relay action under usual conditions.

Referring now to FIG. 12, the operating parts of the relay are shown in the positions of FIG. 11 with the exception that the reset lever 58, with finger 63, has been depressed. This represents a condition that would occur if someone were manipulating the reset lever. If an overload should now occur, the operating parts will move into the positions shown in FIG. 13. In FIG. 13 bridging contact 12 has been partially opened by actuator rod 48, and working arm 54 has come into engagement with the side of finger 63 and the cocking lever 50 is in its normal position relative to actuator 42, that is, the slot 52 in cocking lever 50 is to the right with respect to pivot pin 51, spring 55 normally holding the lever 50 in this position. The position of FIG. 13 is merely transitory and the operating parts will move immediately to the position shown in FIG. 14, wherein the contacts are fully opened. The actuator 42 has moved into its full actuated position while the cocking lever 50 has been held back by its engagement against the side of the reset finger 63, slot 52 having permitted this relative displacement. The apparatus may be readily reset by raising the reset finger 63 to bring it into engagement with the top side of the working arm 54 and resetting may then be accomplished as shown in FIGS. 9–11.

It can thus be seen that the slot 52 and spring 55 are provided to allow for the complete movement of the actuator 42 in the case where tripping conditions occur while the reset lever 58 and the reset finger 63 are held in a depressed position, this structure allowing the relay to be fully trip-free, or capable of tripping regardless of the position of the reset lever 58. The slot 52 and spring 55 operate, in effect, as one means of providing yieldable linkage between the reset lever 58 and the actuator 42. In other words, the arm 54 is mounted, in effect, on the actuator 42 and is blockingly engageable with the reset finger 63, and such engagement would ordinarily serve to limit the motion of the actuator 42. If no "lost motion" means or yieldable connection were to be provided, it would be necessary to increase the length of travel of the actuator 42 so that it would travel far enough to completely open the contacts before blocking occurred as in older relays of this type. In such case, the actuator 42 would then travel still further after the reset finger 63 and arm 54 were moved out of blocking engagement. By virtue of the structure of this invention, however, it is not necessary that such excessive travel be provided thus avoiding undue wear on the contacts and an increase in size of the relay. Further, if trip-free action is provided for by means of increased travel, such travel occurs regardless of whether the reset lever is depressed at the time of tripping or, in other words, whether necessary or not. The yieldable linkage of this invention, however, comes into play only when the relay is tripped while the reset lever is depressed and does not affect the normal operation of the relay.

Still further, the slot 52 and spring 55 serve to decrease the force necessary to reset the relay. Referring to FIGS. 13 and 14, it can be seen that, if the relay were to be tripped with the reset finger 63 in depressed position, and if no "lost motion" means were provided, the arm 54 would be held in blocking engagement with the finger 63 by the relatively strong trip spring 40 and the friction resulting from this engagement would make it difficult to raise the reset lever 58 in order to proceed with resetting. Therefore, it would be necessary that a relatively strong spring, rather than the grasshopper spring 64 shown in FIG. 1, be provided to automatically raise the reset lever 58, and all resetting operations of the relay would have to be accomplished against such spring. A relay formed according to the invention herein, however, may be arranged so that the pin 51 is not quite at the right hand edge of the slot 52, as seen in FIG. 14, at the conclusion of a tripping action. In such case, the arm 54 is held against the reset finger 63 only by the relatively weak spring 55. The resulting friction is lessened and the relatively light grasshopper spring 64 will effectively serve to automatically lift the reset lever 58 for resetting.

Again, it can be seen that the spring 55 and slot 52 serve essentially as a yieldable "lost motion" connection between the actuator 42 and the reset lever 58 to improve the construction and mechanical advantage of the relay as a whole. It will be readily understood, however, that equivalent "lost motion" means could be incorporated into the reset finger 63 rather than the cocking lever 50 without departure from the invention. In other words, it is possible to provide for the yieldability of either blocking element, finger 63 or arm 54, in order to provide for a yielding linkage between reset lever 58 and actuator 42.

Referring now to FIGS. 15-22, there is shown therein a second embodiment of the invention utilizing a rotary motion. Referring first more particularly to FIGS. 15-20, wherein the operating parts of this embodiment are shown in a tripped position, the numeral 69 designates an insulating case comparable to case 1. Mounted on the case 69 by screws 70 and 71 are terminals 72 and 73 having stationary contacts 74 and 75. Stationary contacts 74 and 75 are bridged by a movable contact 76 slidably mounted in an opening 77 of case 69 and guided in its movement by a pin 78 slidably received in case 69. Bridging contact 76 is urged towards closed position by a spring 79 disposed about pin 78 and seated at one end against a wall of the case 69. As seen more particularly in FIG. 19, pin 78 passes through bridging contact 76 and is provided with a relatively larger head 80 engageable with the upper surface of bridging contact 76. Thus a downward force exerted on head 80 will cause an opening movement of the bridging contact 76. Terminals 72 and 73 are provided with terminal screws 81 and 82 thereby providing means for incorporating the device into any desired circuit.

Passing through the top of case 69 is a spindle assembly 15, like that more particularly described in connection with the embodiment of the invention shown in FIGS. 1-8, that mounts a ratchet 30.

Referring now to FIGS. 15 and 16, a trip member 83 is pivotally mounted on a pin 84 provided in case 69. Pawl 85 is mounted on trip member 83 and engageable with ratchet 30. Spring 86, seated at one end against case 69, urges trip member 83 in a clockwise, or tripping, direction, as seen in FIG. 16, about pivot pin 84, such motion normally being prevented by the engagement of pawl 85 with ratchet 30.

As seen in FIGS. 15 and 21, a molded actuator 87 of roughly triangular configuration is also mounted on the pivot pin 84 and is provided with a laterally spaced working projection 88 engageable with the trip member 83 and the pin projection 80. As shown more clearly in FIG. 18, a compression spring 89 acting between the trip member 83 and the actuator 87 serves to urge the actuator 87 in a clockwise direction relative to the trip member 83. It is not necessary, however, to have the spring 89 work between the trip member 83 and the actuator 87, it merely being necessary to provide means to urge the actuator in a clockwise direction, such movement resulting in a retracted position.

Referring now to FIGS. 15 and 21, a primary cocking lever 90, formed from sheet metal, is provided with a slot 91 through which it is pivotally mounted by an assembly pin 92 to the actuator 87. A coil spring 93, mounted on the actuator 87 and operating between the pin 92 and an inwardly turned ear 94 of the primary cocking lever 90, serves to normally maintain the pin 92 in engagement with the right hand end of the slot 91 as seen in FIGS. 15 and 21, this arrangement serving as a "lost motion" means similar to that shown in the relay of FIGS. 1-8. The primary cocking lever 90 is further provided with a generally U-shaped extension terminating in working arm 95. A secondary cocking lever 96 also of sheet metal construction is pivotally connected at one end by an assembly screw 97 to the primary cocking lever 90 and at the other end by a pin 98 to the trip member 83.

A stamped sheet metal reset lever 99 is provided with two slots 100 and 101 through which it is slidably mounted by pins 102 and 103 to the case 69, the extent of its vertical motion being limited thereby. A compression spring 104, seated on the case 69 and a projection 105 of the reset lever 99 and operating therebetween, serves to urge the reset lever 99 in an upward direction. A reset finger 106 is mounted on the reset lever 99 and is carried in a vertical direction upon movement thereof.

In the operation of this embodiment of the invention, the operating elements therein normally occupy the positions shown in FIGS. 21 and 22 wherein the trip member 83 is held against the spring 86 by the engagement of the pawl 85 with the ratchet 30, this being known as a cocked position. The spring 89 has moved the actuator 87 in a clockwise direction as seen in FIG. 21 to a retracted position thereby holding the actuator working projection 88 away from the pin projection 80. Thus the bridging contact spring 79 has been freed to move the bridging contact 76 into engagement with the stationary contacts 74 and 75 thereby completing a circuit therebetween. In addition, the primary cocking lever 90 and the working arm 95 are in the positions shown in FIG. 21 wherein the working arm 95 is not engageable by the reset finger 106.

Referring now to FIGS. 15-20, when an overload has occurred sufficient to fuse the alloy and release the ratchet 30, thereby releasing the pawl 85, the spring 86 causes the trip member 83 to rotate in a clockwise direction, as seen in FIG. 16, about the pivot pin 84 to a tripped position. In this motion the trip member 83 engages the actuator working projection 88 causing the actuator 87 to rotate in a counterclockwise direction as seen in FIG. 15 to an actuated position. As the actuator 87 is carried in its movement to actuated position, the working projection 88 comes into engagement with the pin projection 80 and forces it downwardly thereby causing the bridging contact 76 to be moved against the spring 79 and open the circuit between the contacts 74 and 75. The working arm 95, with the primary cocking lever 90 and the secondary cocking lever 96, is carried in a counterclockwise direction as seen in FIG. 15 by the movement of the actuator 87 to a position wherein it is engageable by the reset finger 106. When the reset lever 99 is then moved downwardly, the finger 106 engages the working arm 95 thereby causing the primary cocking lever 90 to pivot in a clockwise direction, as seen in FIG. 15, about the pin 92. The frictional engagement of the finger 106 with the working arm 95, operating through the primary cocking lever 90 against the pin 92 causes the actuator 87 to be held in actuated position, while the force exerted on the pin 97, operating through the secondary cocking lever 96 on the pin 98, operates to pivot the trip member 83 in a counterclockwise direction as seen in FIGS. 16 and 22, thereby returning the pawl 85 to an engageable position relative to the ratchet 30. The spring 89 is compressed by the relative motion between the actuator 87 and the trip member 83. When the reset lever 99 is then released, the elements will assume positions dependent on the condition of the ratchet 30. If the fusible alloy has cooled, indicating that the overload is no longer present, the trip member 83 will be held in cocked position by the pawl 85, and the spring 89 will return the actuator 87 to a retracted position thereby releasing the bridging contact 76 to be moved to its closed position. Simultaneously, the working arm 95 will be carried to a position wherein it may not be engaged by the reset finger 106. If, however, the ratchet wheel 30 remains rotatable, the elements will again assume the positions of FIGS. 15-20.

As in the embodiment of FIGS. 1-8, it will be noted that the yieldable connection afforded by the slot 91 and the spring 93 does not come into play during normal operation of the relay.

If the finger 106 should have been previously moved into a blocking position by depression of the reset lever 99, a tripping action will cause the inner edge of the working arm 95 to engage the finger 106, thus somewhat shortening the path of movement of the primary cocking lever 90. However, the yielding mounting of the primary cocking lever 90 on the actuator 87 due to the slot 91 and the spring 93 permits the actuator 87 to complete its movement to actuated position regardless of the blocking engagement. As in the first embodiment of the invention, the "lost motion" means, slot 91 and spring 93, serves to allow for a trip-free action without necessitating excessive travel of the actuator 87 and with the other advantages discussed hereinabove. Again, however, the "lost motion" connection between the reset finger 106 and actuator 87 could readily be built into the finger 106 without departure from the invention.

A relay containing this invention may also be easily designed to react to electrical conditions rather than overloads as in those cases where it is desired to initiate some action upon detection of a lack of current flow, or could be further designed to react to chemical or mechanical conditions rather than electrical conditions. In addition, it is not necessary that such a relay employ a contact actuating member, and a valve stem or other type of actuator may be provided. Alternatively, trip-free, tamper-free relays of somewhat different design might well incorporate the yieldable linkage of this invention.

In essence, there has been shown herein two types of relays embodying a "lost motion" connection or yieldable linkage between the actuator and reset lever. It is desired that it be understood, however, that the invention is not to be limited to the particular form or arrangement of parts shown herein except insofar as such limitations are included in the following claims.

I claim:

1. In a relay the combination comprising: a trip member movable between cocked and tripped positions; means to move said trip member toward tripped position; an actuator movable between a retracted position and an actuated position and engageable by said trip member to be moved to actuated position; bias means urging said actuator toward said retracted position; cocking means engageable with said trip member and having a working arm thereon; a movable reset lever having a projecting finger engageable with said working arm for causing the cocking means to return the trip member to its cocked position and a lost motion connection between said reset lever and said actuator whereby said actuator is free to move to said actuated position regardless of the position of said reset lever.

2. In a relay the combination comprising: an actuator movable between a retracted position and an actuated position; trip means to move said actuator toward actuated position, said trip means being capable of being returned to a cocked position; bias means urging said actuator toward said retracted position; cocking means movable in response to the movement of said actuator and engageable with said trip means and having a working arm thereon; and a reset lever having a projecting finger engageable with said working arm, there being a lost motion connection between said finger and said working arm whereby said actuator may complete its movement to said actuated position regardless of the position of said reset lever.

3. In a relay the combination comprising: a trip member movable between cocked and tripped positions; means to move said trip member toward tripped position; an actuator movable between a retracted position and an actuated position which is engageable by said trip member to be carried therewith upon said trip member being moved toward its tripped position, said actuator thereby being moved toward its actuated position; bias means urging said actuator toward said retracted position; cocking means having a working arm thereon which is carried by said actuator and engageable with said trip member; a reset lever having a projecting finger operatively engageable with said working arm and capable of a blocking engagement therewith; and a lost motion connection between said finger and working arm whereby said actuator may complete its movement to actuated position when said finger and said working arm are in blocking engagement.

4. In a relay the combination comprising: a trip member movable between cocked and tripped positions; bias means to urge said trip member toward tripped position; an actuator movable between retracted and actuated positions and engageable with said trip member to be carried thereby in the movement of said trip member toward tripped position, said actuator thereby being moved to its actuated position; bias means to urge said actuator toward retracted position; cocking means carried by said actuator and engageable with said trip member and having a working arm thereon, said working arm having a path of movement corresponding to the movement of said actuator; and a movable reset lever having a projecting finger engageable with said working arm when the same has moved to a position corresponding to the actuated position of said actuator, said finger being capable of a blocking engagement with said arm at a point in the path of movement of said arm prior to the completion of the movement of said actuator to actuated position, there being a lost motion connection between said finger and said working arm whereby said actuator is permitted to complete its movement to actuated position when said working arm and said finger are blockingly engaged.

5. In a relay the combination comprising: an actuator biased toward a retracted position and movable therefrom to an actuated position; tripping means adapted to move said actuator toward its actuated position and to be reset; cocking lever means movable with said actuator and having a working arm with a path of movement corresponding to the movement of said actuator; a reciprocable reset lever having a projecting finger depressable to engage said working arm when said working arm is in a position corresponding to the actuated position of said actuator, said finger being capable of a blocking engagement with said working arm at a point in the path of movement of the arm prior to the completion of the movement of said actuator to actuated position; and a lost motion connection between said cocking lever means and said actuator to allow full movement of said actuator toward actuated position when the finger is in blocking engagement with said arm.

6. In a relay the combination comprising: a trip member movable between cocked and tripped positions; means to move said trip member toward tripped position; an actuator movable between a retracted position and an actuated position which is engageable by said trip member to be carried therewith upon said trip member being moved toward its tripped position, said actuator thereby being moved toward its actuated position; bias means urging said actuator toward said retracted position; cocking lever means mounted upon said actuator to be carried thereby and engageable with said trip member and having a working arm thereon; and a reset lever having a projecting finger movable into engagement with said working surface when said surface has been carried to a position corresponding to the actuated position of said actuator, the engagement of said finger against said working surface causing said cocking lever means to return said trip member toward cocked position while retaining said actuator in actuated position, and said reset finger being movable in a motion by passing said working surface when said cocking lever means is in a position corresponding to retracted position of said actuator, there then being a lost motion connection between the reset lever and actuator permitting said actuator to move toward its actuated position.

7. In a relay having a base, a stationary contact, and a movable contact, the combination with: a trip member slidably mounted on said base and slidable between cocked and tripped positions, being biased toward said tripped position; an actuator slidably mounted on said base and slidable between retracted and actuated positions, being biased toward said retracted position, said actuator being engageable by said trip member to be carried therewith upon movement of said trip member toward tripped position said actuator being carried thereby to actuated position, said actuator also being engageable with said movable contact to actuate the same; a cocking lever pivotally mounted on and carried by said actuator and having a working arm thereon, said arm having a path of movement parallel to and corresponding to the movement of said actuator to actuated position, said cocking lever means being engageable with said trip member; and a reset lever having a projecting finger adapted to be depressed to engage said working arm when said working arm has been carried by said actuator to a position corresponding to the actuated position of said actuator, said reset finger upon said engagement causing said cocking lever to retain said actuator in actuated position while sliding said trip member toward said cocked position, said finger being capable of a blocking engagement with said working arm at a point in the path of movement of said arm prior to the completion of the movement of said actuator to actuated position, there being a lost motion connection between said working arm and said finger whereby said actuator is permitted to complete its movement to actuated position when said working arm and finger are in blocking engagement.

8. In a relay having a base, a stationary contact, and a movable contact, the combination with: a trip member slidably mounted on said base and slidable between cocked and tripped positions, being biased toward said tripped position; an actuator slidably mounted on said base and slidable between retracted and actuated positions, being biased toward said retracted position, said actuator being engageable by said trip member to be carried therewith upon movement of said trip member toward tripped position said actuator being carried thereby to actuated position, said actuator also being engageable with said movable contact to actuate the same; cocking lever means pivotally mounted on and carried by said actuator and having a working arm thereon, said working arm having a path of movement corresponding to the movement of said actuator, said cocking lever means being engageable with said trip member; and a reset lever having a projecting finger adapted to be depressed to engage said working arm when said working arm has been carried by said actuator to a position corresponding to the actuated position of said actuator, said reset finger upon said engagement causing said cocking lever to retain said actuator in actuated position while sliding said trip member toward said cocked position, said finger and said working arm being capable of a blocking engagement, there being a lost motion connection between said cocking lever and said actuator to allow said actuator to complete its movement to actuated position when said finger and working arm are in blocking engagement.

9. In a relay having a base, a stationary contact, and a movable contact, the combination with: a trip member pivotally mounted on said base and pivotable between cocked and tripped positions, being biased toward said tripped position; an actuator pivotally mounted on said base and pivotable between retracted and actuated positions, being biased toward said retracted position, said actuator being engageable by said trip member to be carried therewith upon movement of said trip member toward tripped position said actuator being carried thereby to actuated position, said actuator also being engageable with said movable contact to actuate the same; a primary cocking lever pivotally mounted on and carried by said actuator and having a working arm thereon, said arm having a path of movement corresponding to the movement of said actuator; a secondary cocking lever pivotally mounted on said primary cocking lever and engageable with said trip member; a reset lever having a projecting finger adapted to be depressed to engage said working arm when said working arm has been carried by said actuator to a position corresponding to the actuated position of said actuator said finger upon said engagement causing said primary cocking lever to retain said actuator in actuated position while causing said secondary cocking lever to pivot said trip member toward said cocked position, said finger and said working arm being capable of a blocking engagement at a point in the path of movement of said working arm prior to the completion of the movement of said actuator to actuated position; and a lost motion connection between said primary cocking lever and said actuator to allow said actuator to complete its movement to actuated position regardless of said blocking engagement.

References Cited in the file of this patent

UNITED STATES PATENTS

| | | |
|---|---|---|
| 2,416,253 | Furnas | Feb. 18, 1947 |
| 2,427,437 | Bierenfeld | Sept. 16, 1947 |
| 2,689,896 | Kuhn et al. | Sept. 21, 1954 |
| 2,743,326 | Matthias | Apr. 24, 1956 |
| 2,956,135 | Feil | Oct. 11, 1960 |